United States Patent [19]
Hoshino et al.

[11] Patent Number: 5,027,149
[45] Date of Patent: Jun. 25, 1991

[54] VOICE-RECOGNITION CAMERA

[75] Inventors: Yasushi Hoshino, Tokyo; Tsuyoshi Kakita, Hoya; Makoto Yoshida, Hachioji, all of Japan

[73] Assignee: Konica Corporation, Tokyo, Japan

[21] Appl. No.: 496,646

[22] Filed: Mar. 21, 1990

Related U.S. Application Data

[63] Continuation of Ser. No. 302,175, Jan. 26, 1989, Pat. No. 4,951,079.

[51] Int. Cl.⁵ .............................................. G03B 7/00
[52] U.S. Cl. ...................................... 354/412; 354/467
[58] Field of Search ................................. 354/412, 467

[56] References Cited

U.S. PATENT DOCUMENTS 4,389,109  6/1983  Taniguchi et al. ................. 354/412
4,951,079  8/1990  Hoshino et al. .................... 354/412

Primary Examiner—Russell E. Adams
Attorney, Agent, or Firm—Finnegan, Henderson, Farabow, Garrett, and Dunner

[57] ABSTRACT

A camera for taking photographs by voice recognition operations. The camera comprises a microphone through which voiced command words of an operator are registered in a computer as a form of digital data. The computer identifies the same voiced command words in accordance with the registered data and operates the intended functions of the camera. The camera indicates the functioning of the computer for the registration and the recognition of the voiced command words with a display device so that the operator can confirm his operations on the camera.

9 Claims, 5 Drawing Sheets

WIDE ANGLE POSITION

TELEPHOTOGRAPHIC POSITION

VOICE-RECOGNITION CAMERA

This is a continuation of application Ser. No. 07/302,175, filed Jan. 26, 1989 U.S. Pat. No. 4,951,029.

BACKGROUND OF THE INVENTION

This invention pertains to a voice-recognition camera which operates upon recognizing a voice input. With the advancement of voice-recognition technology, a camera that performs specific operations upon recognizing an input voice or a key word (vocal instruction/command) registered in advance has been under consideration. The user of such a camera can release the shutter by simply telling the camera, "Release." The user does not have to worry about a blurred picture due to the movement of camera caused by the manual releasing action, or he can remotely control the camera.

The conventional voice-recognition camera, however, has problems: first, the camera has no means for a user to check whether his/her voice is registered or recognized by the camera. Consequently, the user cannot determine if the cause of failures, such as a register error or a malfunction of the camera upon voice input, is in the voice recognition system or camera mechanism. It is true that there is no approach presented to this problem so far; second, the vocal instructions for this type of camera are registered conventionally by a recognition circuit system in the register mode according to the sequence determined by the circuit system. For example, multiple switch are installed on the camera; the first switch is for registering an instruction voice for release operation (for example, "release"); the second switch is for registering an instruction voice for self-timer operation (for example, "self-timer"), and so forth.

However, under the conventional registration system, the user must understand the corresponding relations between individual input switches and camera operations, and it makes the voice registration system complicated. This often causes erroneous registration, for example, by depressing the switch for the self-timer when the switch for the release operation should be depressed instead. Moreover, changing a registered instruction voice is similarly complicated.

SUMMARY OF THE INVENTION

The basic concept of this invention should be a camera without the aforementioned problems. The present invention aims to provide a camera with a means of display to indicate registration or recognition of a vocal instruction, in order to solve the aforementioned first problem of function recognition of the vocal operation means.

Another object of this invention is to provide the camera with the simpler configuration for voice registration in relation to the aforementioned second problem. In the present invention, an embodiment, which enables the camera to register a vocal instruction to operate the camera by depressing an actual operation switch of the same camera function in the register mode, is possible.

DETAILED DESCRIPTION OF THE INVENTION

Figure 1:
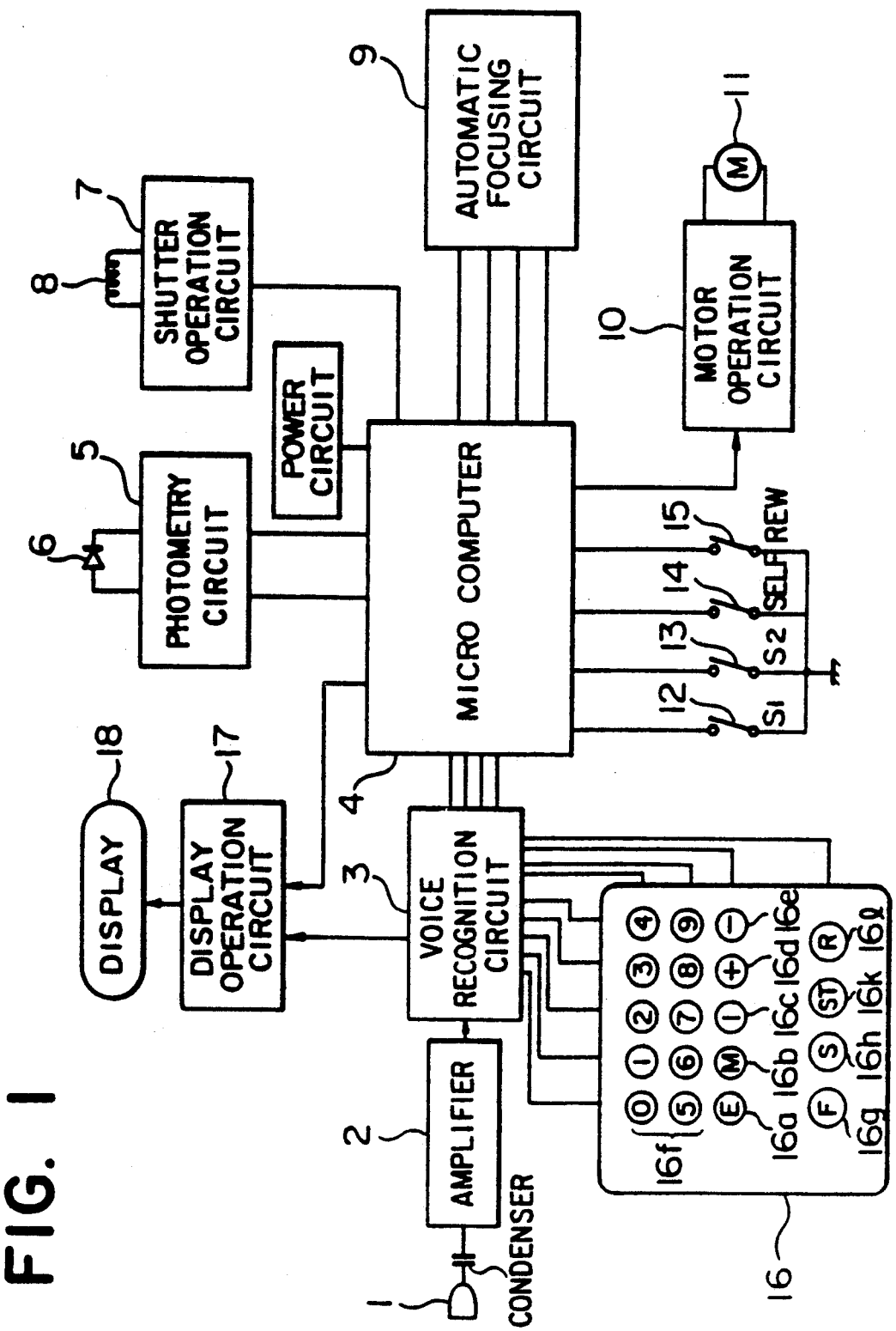
FIG. 1 is a block diagram of the circuit configuration of an embodiment of the voice-recognition camera according to the present invention.

FIG. 1 is a block diagram of the circuit configuration of an embodiment of the voice-recognition camera according to the present invention.

In FIG. 1, numeral 1 indicates a voice-input microphone to be mounted on the back cover of a camera; numeral 2 indicates an amplifier which amplifies inputted aural signals; numeral 3 indicates a voice-recognition circuit which judges whether inputted aural signals match the registered vocal commands; and if yes, it outputs signals according to the vocal commands; numeral 4 indicates a microcomputer which controls individual sections of a camera according to the output signals from voice-recognition circuit 3; numeral 5 indicates a photometric circuit which measures the brightness of a subject by using photodiode 6; numeral 7 indicates the shutter control circuit which turns magnet 8 on or off for controlling the shutter speed; numeral 9 indicates the automatic focusing circuit which checks the focal point of the photographing lens and moves it to a focusing position; numeral 10 indicates a drive circuit for controling film feeder motor 11.

Concerning camera operation switches, numerals 12 and 13 respectively indicate switch $S_1$ and $S_2$; if the release button is lightly depressed for one stage, switch $S_1$ (12) is turned on, and if the release button is further depressed, both switches $S_1$ (12) and $S_2$ (13) are turned on. In the photographing sequence of the camera, if switch $S_1$ (12) is turned on, the intensity of light and range are measured in sequence and if switch $S_2$ (13) is turned on, the lens and shutter are driven and the film is wound up. Numeral 14 indicates the self-timer operating switch; and numeral 15 indicates the rewind switch.

Numeral 16 is the vocal instruction register switch, which consists of matrix switches and connects to voice-recognition circuit 3. Register switch 16 comprises a switch for registering vocal instructions for setting photographic modes and a switch for registering vocal instructions for setting up photographic conditions under individual photograhic modes. The former comprises switch E (16a) which registers vocal instructions for correcting exposure, switch M (16b) which registers vocal instructions for multiple exposure, and switch I (16c) which registers vocal instructions for interval exposure; the latter comprises "+" switch 16d which registers the vocal instruction for setting an over-exposure in the exposure correction mode, "−" switch 16d which registers the vocal instruction for setting an under-exposure, and numeral switch 16f which registers the vocal instruction for setting the compensation for an iris diaphragm, the number of frames for multiple exposure, and the interval time for interval exposure.

For register switches, switch F (16g) registers the vocal instruction for focus lock; switch ST (16h) registers the vocal instruction for the self-timer, and switch R (16*l*) registers the vocal instruction for rewinding film. Voice-recognition circuit 3 enters the voice register mode if register switches 16 are operated wherein all camera driving is inhibited except for display 18. If register switches 16 are not operated, voice-recognition circuit 3 changes to the voice-recognition mode.

Using these register switches, the instruction voice as outlined in the following table may be registered.

| Register switch: | Vocal instruction (examples) |
| --- | --- |
| Switch E, 16a: | "Exposure" |
| Switch M, 16b: | "Multiple Exposure" |
| Switch T, 16c: | "Interval" |
| + Switch, 16d: | "Over" |
| − Switch, 16e: | "Under" |
| Switch F, 16g: | "Focus Lock" |
| Switch S, 16h: | "Release" |
| Switch ST, 16k: | "Self-timer" |
| Switch R, 16l: | "Rewind" |
| Numeral switch 16f: | |
| 0 | "Zero" |
| to | to |
| 9 | "Nine" |

Numeral 17 indicates the display operation (drive) circuit which drives display section 18 according to the output from voice-recognition circuit 3 or microcomputer 4.

Display section 18 is installed, for example, on the upper part of the camera for easy recognition of its indication. It is configured with a device such as liquid crystal display as shown in FIG. 2.

Figure 2:
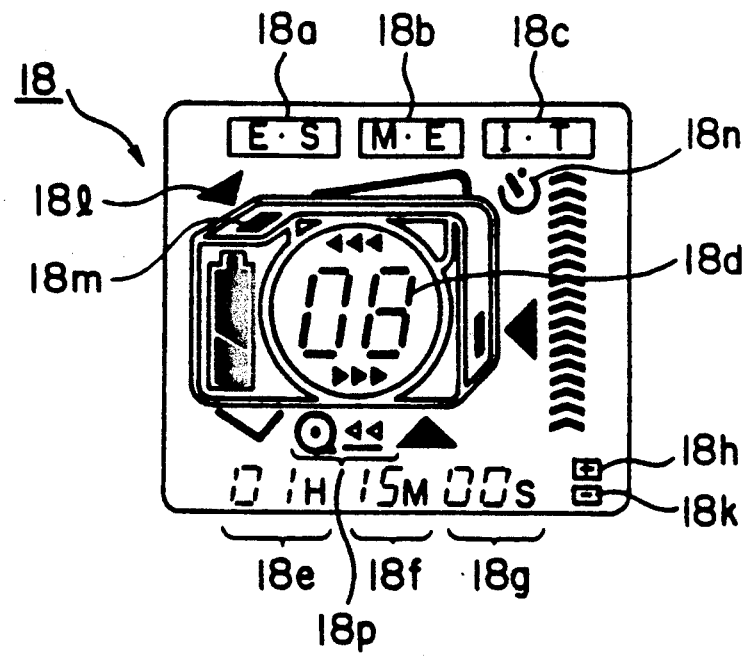
FIG. 2 is an enlarged diagram showing the camera display section, FIGS. 3(A) and (B) are mounting diagrams of a voice input microphone, FIGS. 4(A) and (B) are mounting diagrams of a voice input microphone for a camera with a zoom lens.

FIG. 2 shows that numeral 18a indicates the "ES" part of the display which functions if a vocal instruction for exposure compensation is registered by the voice-recognition circuit during the register mode, or recognized by the circuit during the recognition mode; numeral 18b indicates the "ME" part of the display which functions if a vocal instruction for the multiple exposure is registered or recognized; numeral 18c indicates the "IT" part of the display which functions if a vocal instruction for the interval exposure is registered or recognized; numeral 18d indicates the numeral display part which indicates numbers if a vocal instruction for a numeral is registered or recognized; numerals 18e, 18f, and 18g indicate the time display parts which indicate the time if respective vocal instruction for an interval time is recognized; these time display parts indicate from left to right: hours, minutes, and seconds.

Numeral 18h indicates the display part for overexposure mode which functions if a vocal instruction for overexposure setting is registered or recognized; and numeral 18k indicates the display part for underexposure mode which functions if a vocal instruction for underexposure setting is registered or recognized.

Numeral 18l indicates the S₁ mode display part which functions if a vocal instruction for focus lock is registered or recognized; numeral 18m indicates the S₂ mode display part which functions together with S₁ mode display part 18l if a vocal instruction for shutter operation is registered or recognized.

Numeral 18n indicates the self-timer mode display part which functions if a vocal instruction for self-timer operation is registered or recognized; and numeral 18p indicates the rewind mode display part which functions if a vocal instruction for rewind operation is registered or recognized.

Moreover, numeral display part 18d indicates photographic conditions for special photographing and the number of photographed frames of the film in the camera. The registration by vocal instructions will be explained by quoting the case of a special photographing.

If switch E (16a) is turned on, "ES" part of the display 18a starts blinking.

If a command "Exposure" is inputted, voice-recognition circuit 3 registers it as the vocal instruction to activate the exposure compensation mode. Once it is registered, "ES" part of the display 18a stops blinking and remains; it stops its indication if switch E (16a) is turned off thereafter. Then, if switch M (16b) is turned on, "ME" part of the display 18b starts blinking. If a command "Multiple Exposure" is inputted, it is registered as the instruction voice for setting the multiple exposure mode.

Once it is registered, "ME" part of the display 18b stops blinking and remains; it stops its indication if switch M (16b) is turned off thereafter. Similarly from there onward, the vocal instructions (see the aforementioned table) are registered in correspondence with the individual switches that configure register switch 16. During the registration, "IT" part of the display 18c, numeral display part 18d, overexposure mode and underexposure mode display parts 18h and 18k all blink, remain and stop their indications similarly to "ES" part of the display 18a and "ME" part of the display 18b. In addition to those display parts, S₁ mode display part 18l and S₂ mode display part 18m, self-timer mode display part 18n and rewind mode display part 18p also operate in the same way. By these indications, the user can recognize that individual vocal instructions have been registered.

The recognition mode operation will now be explained. For the operation of special modes, a vocal instruction is inputted through microphone 1 to set up a photographing mode and its conditions.

Supposing now that an underexposure photography is to be taken with setting the diaphragm two stops under, the photographing mode is first set up by inputting a vocal instruction "Exposure" through microphone 1. If the instruction "Exposure" is recognized, "ES" part of the display 18a indicates the confirmation that recognition has been made by the camera. Voice-recognition circuit 3, upon recognizing the mode, enters the state for recognizing photographing condition, and if a vocal instructions "Under" is then entered, underexposure mode display part 18k indicates that the instruction "Under" has been recognized. Then, a vocal instruction "Two" is entered through microphone 1.

If voice-recognition circuit 3 recognizes the instruction "Two", numeral display part 18d displays "2". This completes the setting of the photography mode and condition, and voice-recognition circuit 3 outputs signals corresponding to the set mode and condition to microcomputer 4, which controls individual sections of the camera to take a photograph with an underexposure effect, once it has been started.

The same procedures apply to the multiple exposure mode: "ME" part of the display 18b functions if a vocal instruction "Multiple Exposure" is entered through microphone 1; if "Zero" and "Eight" are entered in succession, numeral display 18d displays "08"; and voice-recognition circuit 3 recognizes that a multiple exposure of eight frames is instructed.

For the interval exposure mode, if a vocal instruction "Interval" is entered, the "IT" part of the display 18c indicates for the confirmation that the system is now in the interval exposure mode. The voice-recognition circuit 3 becomes to a standby state for inputting interval time instructions, and if "Zero", "One", "Five", "Zero", "Zero" are entered in succession, the hour display part 18e displays "01", the minute display part 18f displays "15", and the second display part 18g displays "00", for the confirmation that an interval time of one hour and fifteen minutes has been recognized. If "Zero" and "Three" are entered for setting the number of frames to be photographed, the numeral display part 18d displays "03". The result of recognition by the voice-recognition circuit 3 is turned out to the microcomputer 4, which controls the individual sections of the camera accordingly, and the camera repeats photographing operations for three frames with the interval time of one hour and fifteen minutes.

The other displays function in the same way. In other words, if a vocal instruction "Focus Lock" is recognized, $S_1$ mode display part 18l functions, and if a vocal instruction "Release" is recognized, both $S_1$ mode display part 18l and $S_2$ mode display part 18m function. Moreover, if vocal instructions "Self-Timer" and "Rewind" are recognized, self-timer mode display part 18n and rewind mode display part 18p function respectively.

Each of the aforementioned display parts are turned off with the completion of camera operation.

In the aforementioned embodiment of this invention, voice-recognition circuit 3 has registration and recognition modes as its operation modes; it is possible to add a checking mode to the operation modes. If a camera is used after it has not been used for a long time, the user may wish to check if the camera recognizes a registered vocal instruction, or if a certain vocal instruction is already registered in it. For such a case, the voice-recognition circuit should be set to the checking mode; the camera may not operate even if an vocal instruction is inputted, but display 18 should display the result of recognition accordingly.

Figure 3A:
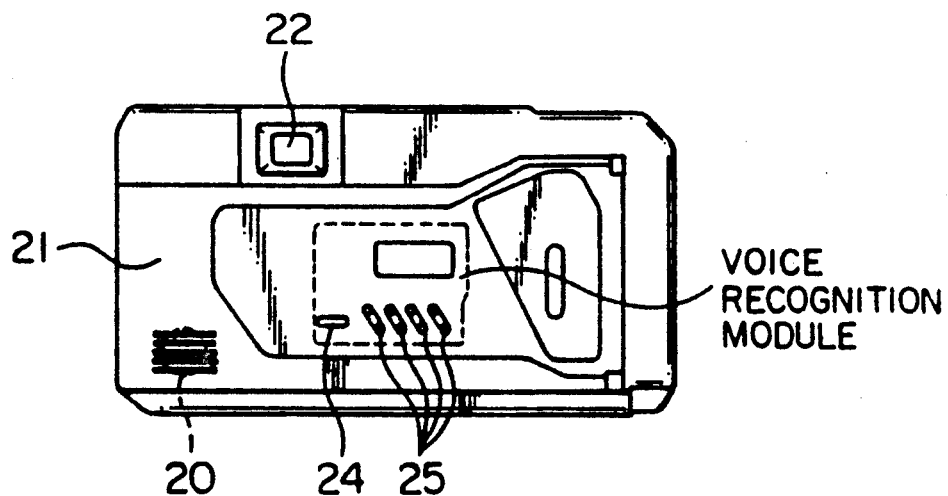

FIG. 3(A) shows the installation position of microphones to a voice-recognition camera in which first voice input microphone 20 is installed to the lower section of the back cover of the camera. Microphone 20 may be installed at the bottom section of the camera or elsewhere from where it can easily catch the user's vocal instructions while he/she views a subject through finder 22.

Figure 3B:
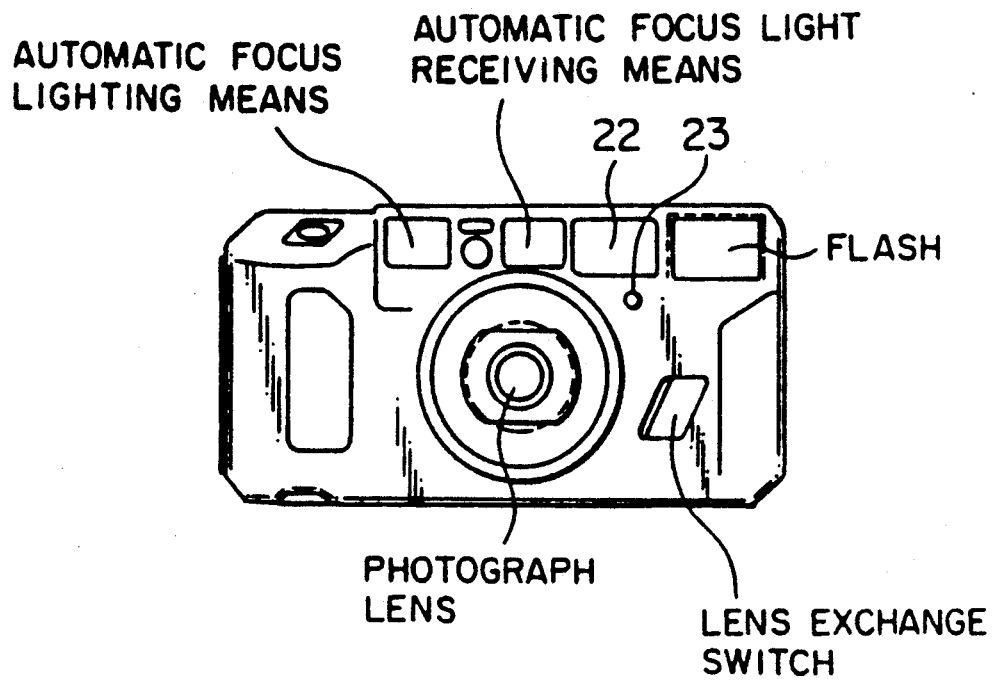

Moreover, to catch a vocal instruction from the front of the camera (e.g. group photographing), second microphone 23 is installed in front of the camera as shown in FIG. 3(B). Switch 24 interchanges first microphone 20 to second microphone 23 and vice versa. However, if the camera is in register mode or voice registration is enforced by the register switch 25, the registration is accomplished with first microphone 20 while second microphone 23 is turned off.

For second microphone 23, a type which has a forward directivity corresponding to the photographing angle is used. That is, microphone 23 receives a voice input only if the vocal instruction is made within the photographic angle of field.

For a camera with a zooming function, microphone directivity may be changed according to the zooming position of lens.

Figure 4A:
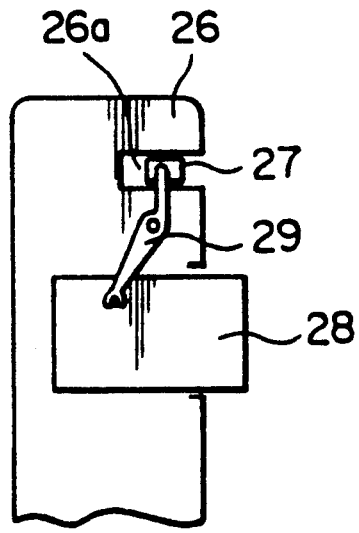

For example, as FIG. 4(A) shows, microphone 27, which can move in the direction of optical axis of the camera lens, is installed inside of microphone hole 26a on main camera body 26.

Figure 4B:
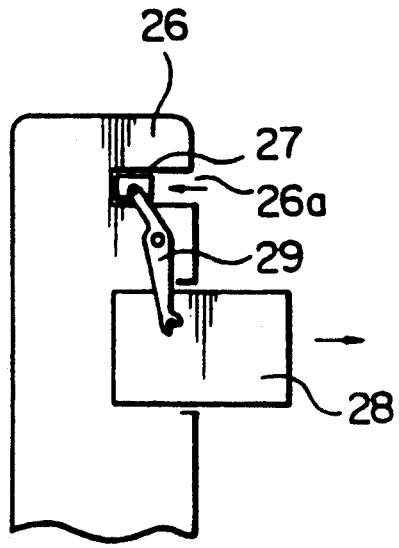

Microphone 27 is connected to zoom lens 28 by lever 29. As FIG. 4(B) shows, if zoom lens 28 zooms forward, microphone 27 moves to the reverse direction, that is the direction to the bottom of microphone hole 26a. This narrows down the directivity of microphone 27, and makes it adjustable to the change of the photographic angle of field. As thus far described, this invention has solved the first problem by displaying the registration or recognition of vocal instructions; therefore, this invention offers the following advantages: It is possible to check the operating state of the voice-recognition means, thus preventing erroneous registrations of vocal instructions, and allowing the user to determine whether the voice-recognition system or the camera mechanism is the problem when the camera fails to operate in response to a vocal instruction.

The embodiment of the present invention, in which the camera operating switches which are also configured to serve as input switches for registration, will be explained. In this way, switch operations are simplified as to acchieve the second aim of this invention.

Figure 5:
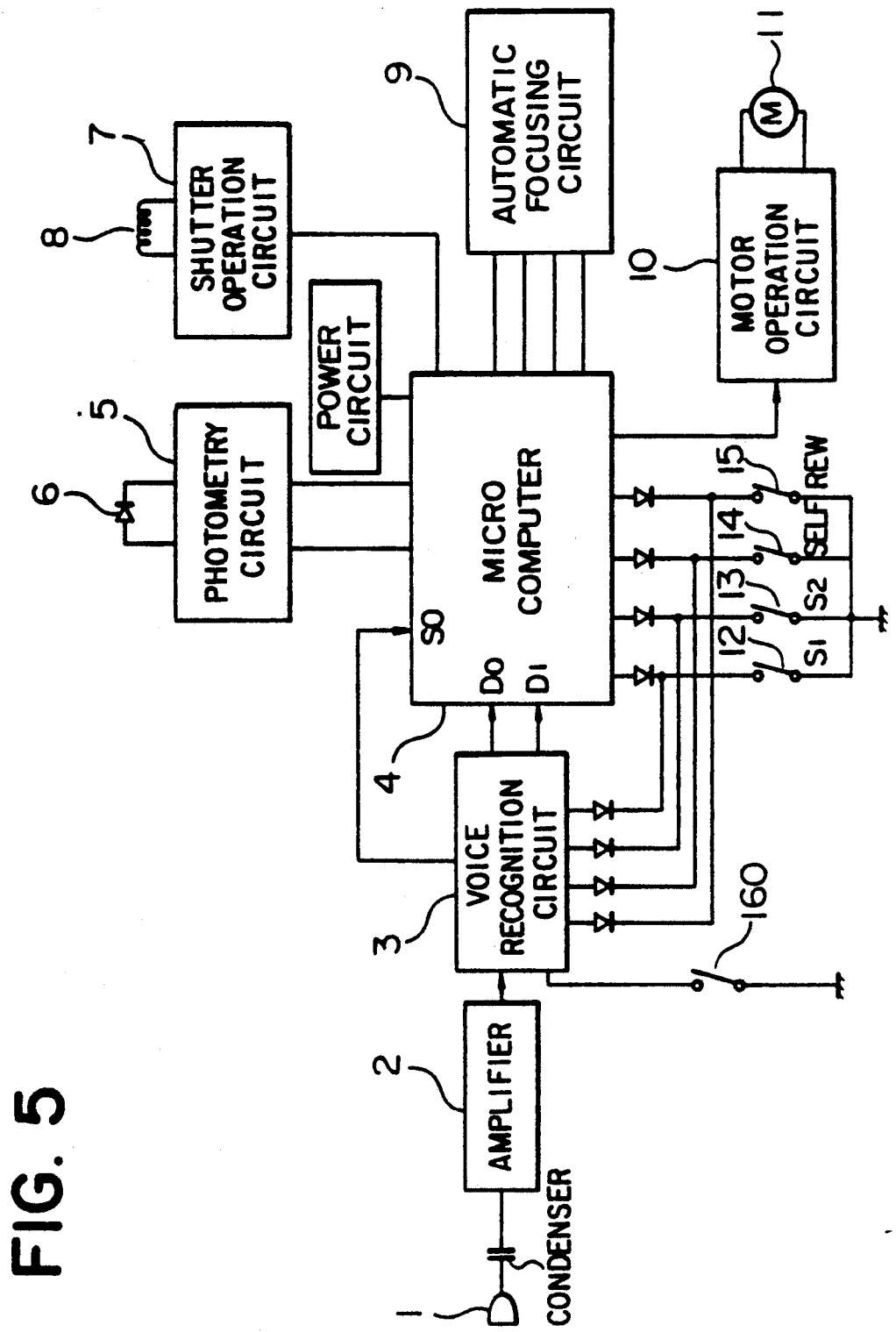
FIG. 5 is a block diagram of the circuit configuration of an embodiment of the voice-recognition camera according to this invention.

FIG. 5 is a block diagram of the circuit configuration of the second embodiment of a voice-recognition camera according to this invention. In FIG. 5, the parts numbered identically to those in FIG. 1 have identical functions.

In this embodiment, one of the terminals of camera operating switches 12 to 15 is grounded while the other terminal is connected via a diode to microcomputer 4 and input terminals $I_0$ to $I_3$ of voice-recognition circuit 3.

Switch 160 changes the recognition mode to registration mode and vice versa; one of the terminals is connected to voice-recognition circuit 3. If mode switch 160 is on, the camera system is in registration mode and if it is off, the system is in recognition mode.

The operation of the present embodiment is described below.

To register a vocal instruction, while mode switch 160 is turned on, a switch for a desired operation selected from switches 12 to 15 is to be operated, so that the vocal instruction is inputted through microphone 1. Voice-recognition circuit 3 turns out a signal to the SO terminal of microcomputer 4 to make the computer inoperable; according to the signal received from mode switch 160 and a selected operating switch, the circuit registers a voice input as a vocal instruction to activate the same function as the camera function which is also started by the aforementioned switch. The following table outlines the signal levels of input terminals $I_0$ to $I_3$ of voice-recognition circuit 3 and gives examples of the vocal instructions when individual operating switches 12 to 15 are turned on.

| Operating switch | $I_0$ | $I_1$ | $I_2$ | $I_3$ | Vocal Instruction | $D_0$ | $D_1$ |
|---|---|---|---|---|---|---|---|
| $S_1$ Switch 12 | 0 | 1 | 1 | 1 | "Focus Lock" | 0 | 0 |
| $S_2$ Switch 13 | 0 | 0 | 1 | 1 | "Release" | 0 | 1 |
| Self-timer switch 14 | 1 | 1 | 0 | 1 | "Self-Timer" | 1 | 0 |
| Rewind switch 15 | 1 | 1 | 1 | 0 | "Rewind" | 1 | 1 |

For example, the release button is lightly depressed to turn on switch $S_1$ (12), and the vocal instruction "Focus Lock" is inputted through microphone 1 and the release button is further depressed to turn switch $S_2$ (13) on and the vocal instruction "Release" is inputted; self-timer switch 14 is similarly turned on and the vocal instruction "Self-Timer" is inputted; the vocal instruction "Rewind" is also able to be inputted after turning on rewind switch 15.

This completes the registration of each voice input as the instruction for the function which is identical to that of the corresponding switch.

The operation in the recognition mode is explained below. If mode switch 160 is turned off, the camera becomes to the recognition mode; voice-recognition circuit 3 turns out a start signal to the SO terminals of microcomputer 4 so that the computer becomes operable. Microcomputer 4 is now ready to be operated by the outputs from either voice-recognition circuit 3 or operating switches 12 to 15.

Figure 6:
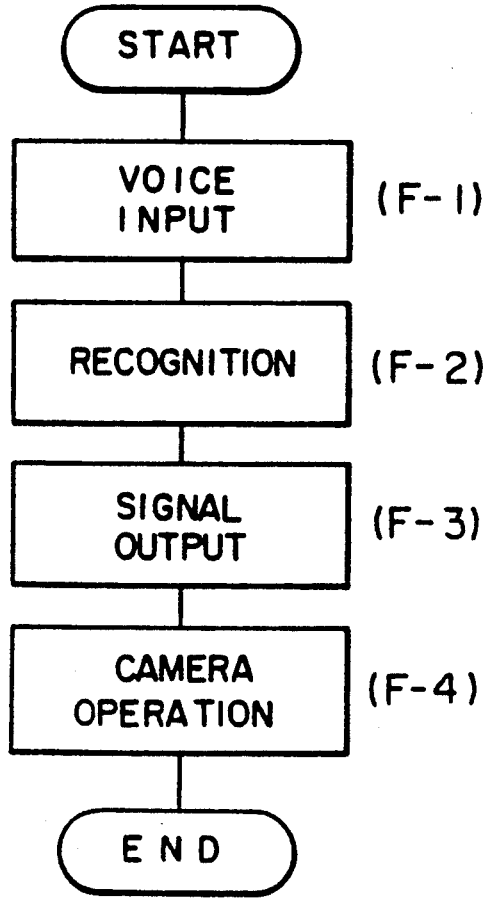
FIG. 6 is a flowchart explaining the operation of above embodiments in the recognition mode.

The functions of this embodiment, according to the invention, are described with reference to the flowchart of FIG. 6.

If a voice input is inputted (F-1), voice-recognition circuit 3 judges whether the inputted voice matches the registered vocal instruction (F-2); and if yes, it turns out a corresponding signal (2-bit signal) to terminals $D_0$ and $D_1$ of microcomputer 4 (F-3). An example of this signal is indicated at the right-hand end of the above table. For example, if the vocal instruction "Focus Lock" is recognized, "O" and "O" signals are turned out to input terminals $D_0$ and $D_1$ of microcomputer 4 respectively.

According to the output signals from voice-recognition circuit 3, microcomputer 4 operates the camera in response to the inputted voice (F-4). In other words, if the vocal instruction "Focus Lock" is inputted, photometry and range finding functions are done, and with the input of the vocal instruction "Release", the lens and shutter drives are made followed by film rewinding. If the vocal instruction "Self-Timer" is inputted, the self-timer is into operation, and if the vocal instruction "Rewind" is inputted, the camera starts rewinding film.

As thus far described, voice registration is done by using the actual camera operating switches; therefore, registering procedures become much simplified with less chance for erroneous registrations. Moreover, vocal instructions can be re-registered easily.

Since the camera operating switches are shared as the input switches for registration, no additional members are required thus contributing to the low-cost equipment configuration.

Moreover, in the aforementioned description of the second embodiment of the present invention, special photographing modes have been omitted and the registration of vocal instructions, using the actual camera operating switches, is realized for a simple configuration; however, the registration of an individual vocal instruction in the special photographing modes is possible by using specialized switches for special modes in the same manner as described first embodiment.

Furthermore, in the second embodiment of this invention, checking systems with a display for registration and recognition of vocal instructions have not been mentioned; however, the above mentioned checking operation can be naturally and easily performed by incorporating the display explained in the description of the first embodiment into the second embodiment.

For the voice-recognition circuit of the above mentioned embodiments, a voice-recognition IC is used; it is based on the so called specific speaker voice-recognition which registers the voice spectrum of a specific speaker. This invention is obviously applicable no matter what type of voice-recognition system is used; and in the near future, if a voice-recognition camera, that linguistically analyzes voice and operates by understanding the meaning of such a voice, is developed, the present invention may easily be applied to such a camera.

This invention can provide an easy voice registration with an extremely simple configuration in an embodiment in which a vocal instruction is registered in the register mode using actual camera operating switches.

What is claimed is:

1. In a photographic camera including functions responsive to voice commands of a user, the camera having a registration mode and an recognition mode, means in the registration mode for registering a particular voice command with a selected function, a memory for storing each registered voice command, means in the recognition mode for recognizing a voice command as registered, and means in the recognition mode responsive to the recognition means for activating the function corresponding to the recognized voice command, the improvement comprising:

first means in the registration mode for visually displaying a symbol representative of each function selected for voice command registration;

second means in the registration mode for visually displaying a symbol representative of each function for which a voice command has been successfully registered; and third means in the recognition mode responsive to a registered voice command for visually displaying a symbol representative of the function for which the voice command is recognized.

2. The camera of claim 1 also including a checking mode, means for selectively engaging the checking mode, and means responsive to engaging the checking mode for enabling the third means and disabling the activating means to permit determining whether a voice command is registered for a particular function without activating the function.

3. In a photographic camera including functions responsive to voice commands of a user, the camera having a registration mode and an recognition mode, means in the registration mode for registering a particular voice command with a selected function, a memory for storing each registered voice command, means in the recognition mode for recognizing a voice command as registered, and means in the recognition mode responsive to the recognition means for activating the function corresponding to the recognized voice command, the improvement comprising:

a display including a visual symbol representative of each function responsive to a voice command;

first means in the registration mode for activating to a first state the symbol in the display representative of the function selected for voice command registration;

second means in the registration mode for activating to a second state the symbol in the display representative of each function for which a voice command has been successfully registered; and third means in the recognition mode responsive to a registered voice command for activating to the second state the symbol in the display representative of the function for which the voice command is registered.

4. In the camera of claim 1 wherein the functions responsive to voice commands are also manually actuable through separate switches, the improvement further comprising:

means for selectively engaging the registration mode; and means in the registration mode responsive to manual actuation of the separate switch associated with a function for identifying that function as the selected function for which a voice command is to be registered.

5. The camera of claim 1 wherein the functions responsive to voice commands include camera operation functions also manually actuable through separate switches and special photographic functions also manually controllable, the improvement further comprising:

means for selectively engaging the registration mode;

means in the registration mode responsive to manual actuation of the separate switch associated with a camera operation function for identifying that camera operation function as the selected function for which a voice command is to be registered; and a manually operable registration switch for each special photographic function actuation of which identifies the associated special photographic function as the selected function for which a voice command is to be registered.

6. The camera of claim 5 wherein the engaging means is a separate manually operable control.

7. The camera of claim 5 wherein operation of a registration switch engages the registration mode for voice command registration of special photographic functions and wherein the engaging means is a separate manually operable control for engaging the registration mode for voice command registration of camera operation functions.

8. In a photographic camera including functions responsive to voice commands of a user and also manually operable by separate switches, the camera having a registration mode and a recognition mode, means in the registration mode for registering a particular voice command with a selected function, a memory for storing each registered voice command, means in the recognition mode for recognizing a voice command as registered, and means in the recognition mode responsive to the recognition means for activating the function corresponding to the recognized voice command, the improvement comprising:

means for selectively engaging the registration mode; and means in the registration mode responsive to manual actuation of the separate switch associated with a function for identifying that function as the selected function for which a voice command is to be registered.

9. A photographic camera responsive to voice commands, the camera having camera operation functions manually operable through separate switches and manually controllable special photographic functions, the camera comprising:

a microphone for receiving a voice command of a user;

means connected to the microphone for converting voice commands to representative digital data;

a memory for storing digital data;

a registration mode including means connected to the converting means and memory for digitally registering in the memory a particular voice command with a selected function;

a recognition mode including means connected to the converting means and the memory for recognizing a voice command corresponding to a voice command digitally registered in the memory and means connected to the recognizing means for actuating the function associated with a recognized voice command;

means for manually selecting between the registration and recognition modes;

means in the registration mode responsive to manual actuation of the separate switch associated with a camera operation function for identifying that camera operation function as the selected function for which a voice command is to be registered;

a manually operable registration switch for each special photographic function;

means responsive to actuation of a registration switch for identifying the special photographic function associated with the registration switch as the selected function for which a voice command is to be registered;

a display including a visual symbol representative of each function responsive to a voice command;

first means in the registration mode for activating to a first state the symbol in the display representative of the function selected for voice command registration;

second means in the registration mode for activating to a second state the symbol in the display representative of each function for which a voice command has been successfully registered; and third means in the recognition mode responsive to a registered voice command for activating to the second state the symbol in the display representative of the function for which the voice command is registered.

* * * * *